United States Patent [19]
Romi

[11] Patent Number: 5,316,417
[45] Date of Patent: May 31, 1994

[54] MICROMETRIC DEVICE FOR FINISHING HIGH PRECISION BORES

[75] Inventor: Giordano Romi, Sta. Bárbara d'Oeste-SP, Brazil

[73] Assignee: Industrias Romi S/A, Brazil

[21] Appl. No.: 57,705

[22] Filed: May 4, 1993

[30] Foreign Application Priority Data

Oct. 8, 1992 [BR] Brazil .............................. PI 9204014

[51] Int. Cl.⁵ ................................................ B23B 51/00
[52] U.S. Cl. .................................... 408/153; 408/158; 408/161
[58] Field of Search ............... 408/153, 158, 161, 168, 408/169

[56] References Cited

U.S. PATENT DOCUMENTS

| | | | |
|---|---|---|---|
| 4,516,889 | 5/1985 | Ortlieb | 408/153 |
| 4,648,757 | 3/1987 | Plummer | 408/161 |
| 4,793,748 | 12/1988 | Santi | 408/161 |
| 5,222,846 | 6/1993 | Romi | 408/161 |

FOREIGN PATENT DOCUMENTS 9006125 1/1993 Brazil .

*Primary Examiner*—Daniel W. Howell
*Attorney, Agent, or Firm*—Steinberg & Raskin

[57] ABSTRACT

The invention relates to an improved micrometric device for finishing high precision bores. The device has a substantially cylindrical body having a displacement system arranged in an interior thereof. The displacement device actuates on a tool holder which is then displaced in the same direction of the radial component of the workforce. The micrometric device is also provided with a backlash suppression system. In accordance with the present invention, the micrometric device has an upper cylindrical body mounted and fixed to a lower cylindrical body, both of which coaxially envelop a graduated drum. The graduated drum, in turn, is coaxially mounted and connected to a micrometric screw arranged longitudinally in the interior of the micrometric device. In the interior of the micrometric device, and connected to an upper extension of the micrometric screw, a conversion mechanism is arranged which changes a rotating movement of the micrometric screw into a linear movement of a movable crossbeam. The crossbeam is indirectly connected to the micrometric screw and supports the tool holder and respective cutting tool.

24 Claims, 10 Drawing Sheets

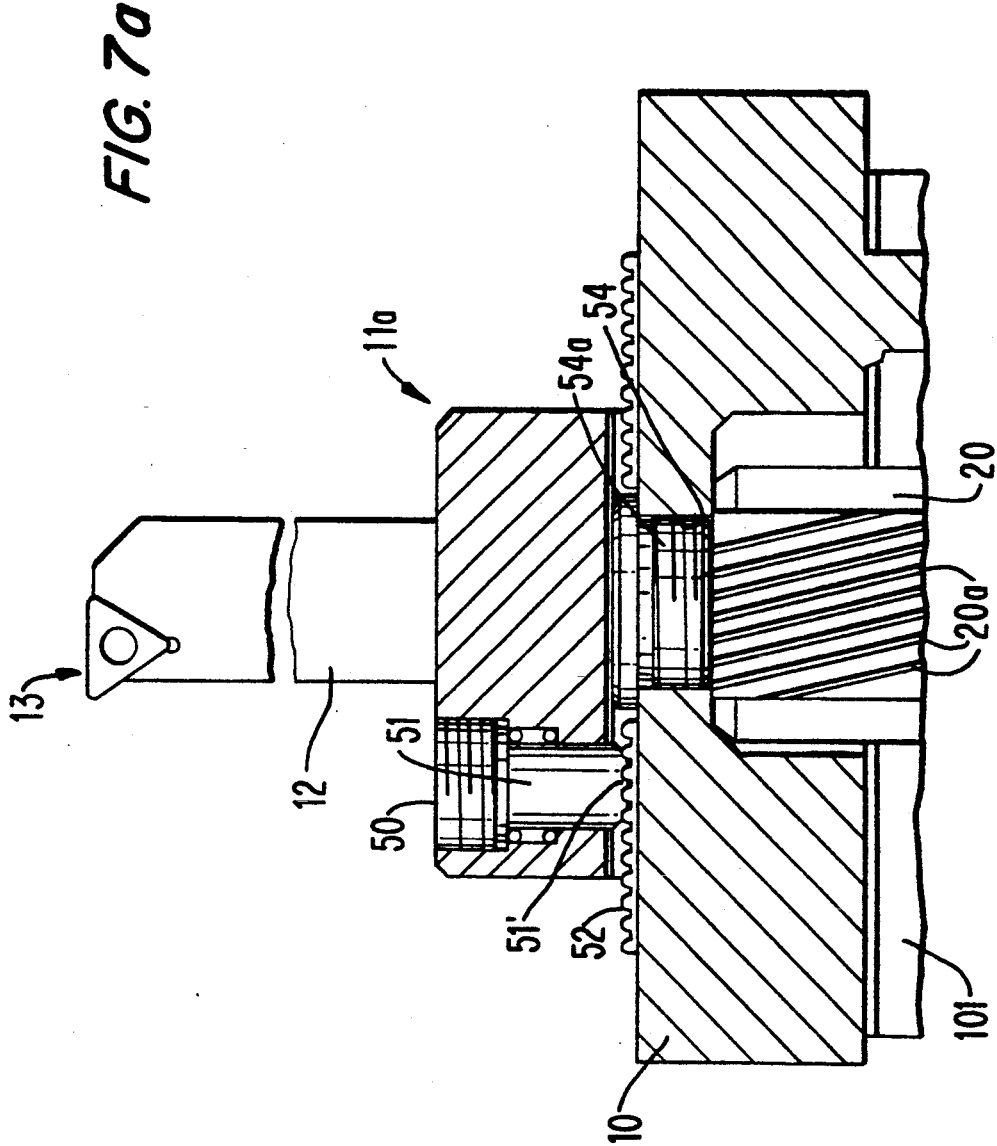

MICROMETRIC DEVICE FOR FINISHING HIGH PRECISION BORES

BACKGROUND OF THE INVENTION

The present invention relates to improvements in a micrometric device for finishing high precision bores and more precisely to improvements introduced on a micrometric device used for finishing high precision through and/or blind bores. The present invention may be used to improve micrometric devices such as those described in Brazilian Patent Application No. PI 9006125, filed Dec. 3, 1990, corresponding to U.S. patent application No. 07/738,918, now U.S. Pat. No. 5,222,846 the specification of which is incorporated by reference herein.

OBJECTS AND SUMMARY OF THE INVENTION

It is an object of the present invention to provide improvements in a micrometric device used for finishing high precision bores such that a more compact construction concept is obtained. This results in a reduction in the dimensional requirements for the micrometric device as well as an increase in the structure rigidity. The structural rigidity of the device is important when considering the high speed of rotation of the tool of the micrometric device.

It is another object of the present invention to provide improvements on a micrometric device used for finishing high precision bores and provided with mechanical means in such a manner to produce the combined effect of backlash suppression and fine adjusting through threaded elements of different pitches.

Briefly, the improved micrometric device used for finishing high precision bores in accordance with the present invention comprises a tool holder having a cutting tool arranged thereon, a substantially cylindrical body having an interior, a movable crossbeam for supporting the tool holder, and displacement means arranged in the interior of the body for displacing the tool holder. The displacement means include a backlash suppression system. A rotating micrometric screw is arranged in the interior of the body of the device and has an upper extension. The device further includes converting means for changing a rotational movement of the micrometric screw into a linear movement of the movable crossbeam. The converting means are connected to the upper extension of the micrometric screw. The cylindrical body of the device comprises an upper cylindrical body and a lower cylindrical body whereby the upper body is mounted on the lower body. A graduated drum is coaxially mounted and connected to the micrometric screw and coaxially arranged between the upper body and lower body of the micrometric device.

BRIEF DESCRIPTION OF THE DRAWINGS

The following drawings are illustrative of embodiments of the invention and are not meant to limit the scope of the invention as encompassed by the claims.

FIG. 7a is a section view of the tool holder used for machining bores smaller than the micrometric device body, and bores as small as the external diameter of the tool shank used in the device in accordance with the invention.

DETAILED DESCRIPTION OF THE INVENTION

Figure 1:
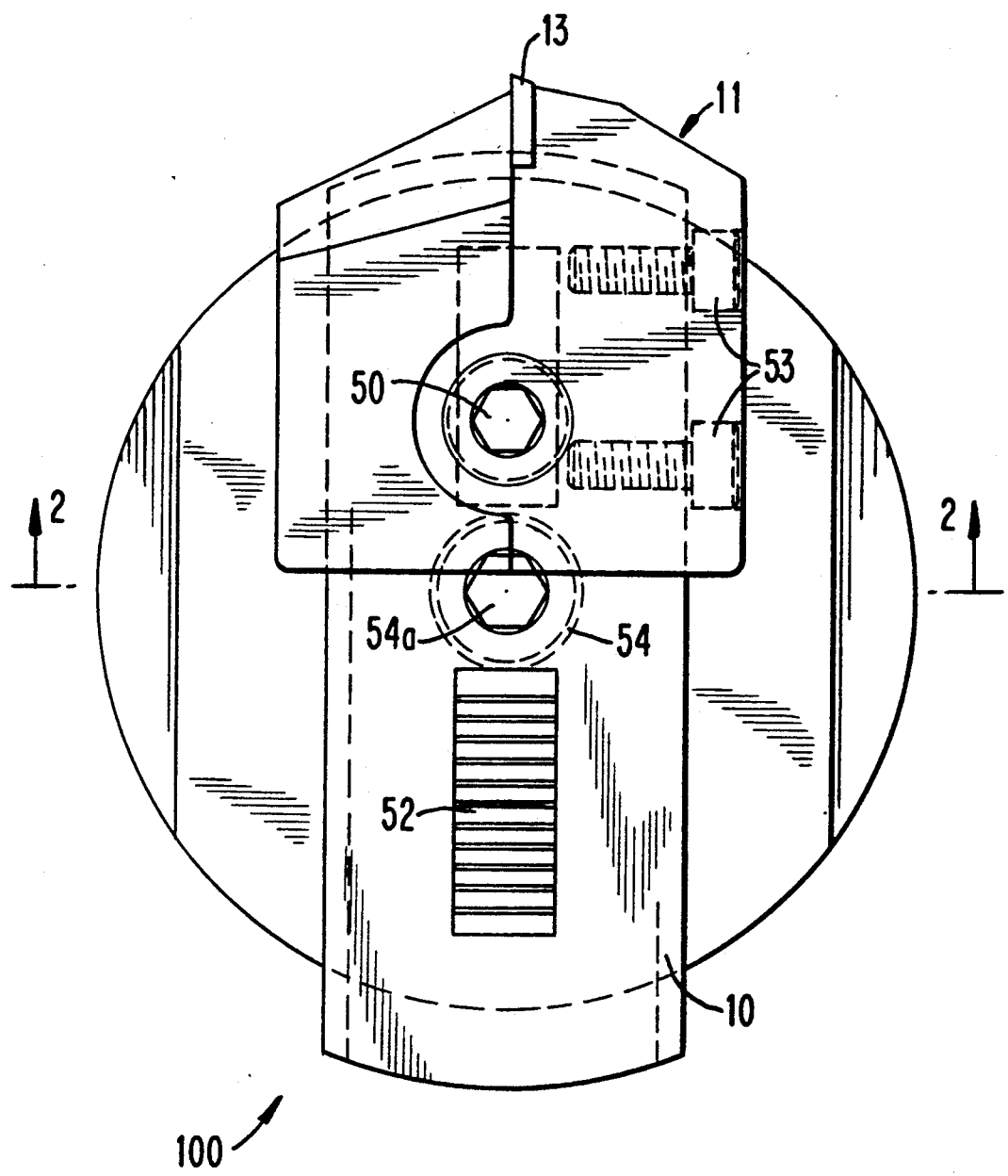
FIG. 1 is an upper view of a micrometric device in accordance with the present invention, showing the tool holder arranged on its base.

Referring to the drawings, the improvements on a micrometric device used for finishing high precision bores in accordance with the present invention comprise several constructive changes introduced to prior art micrometric devices such as those described and claimed in Brazilian Patent application No. PI 9006125.

The micrometric device of the present invention is useful for finishing both through and blind bores. Moreover, the improvements of the present invention enable the micrometric device to finish bores having a very small diameter, e.g., as shown in FIG. 7a.

Figure 3:
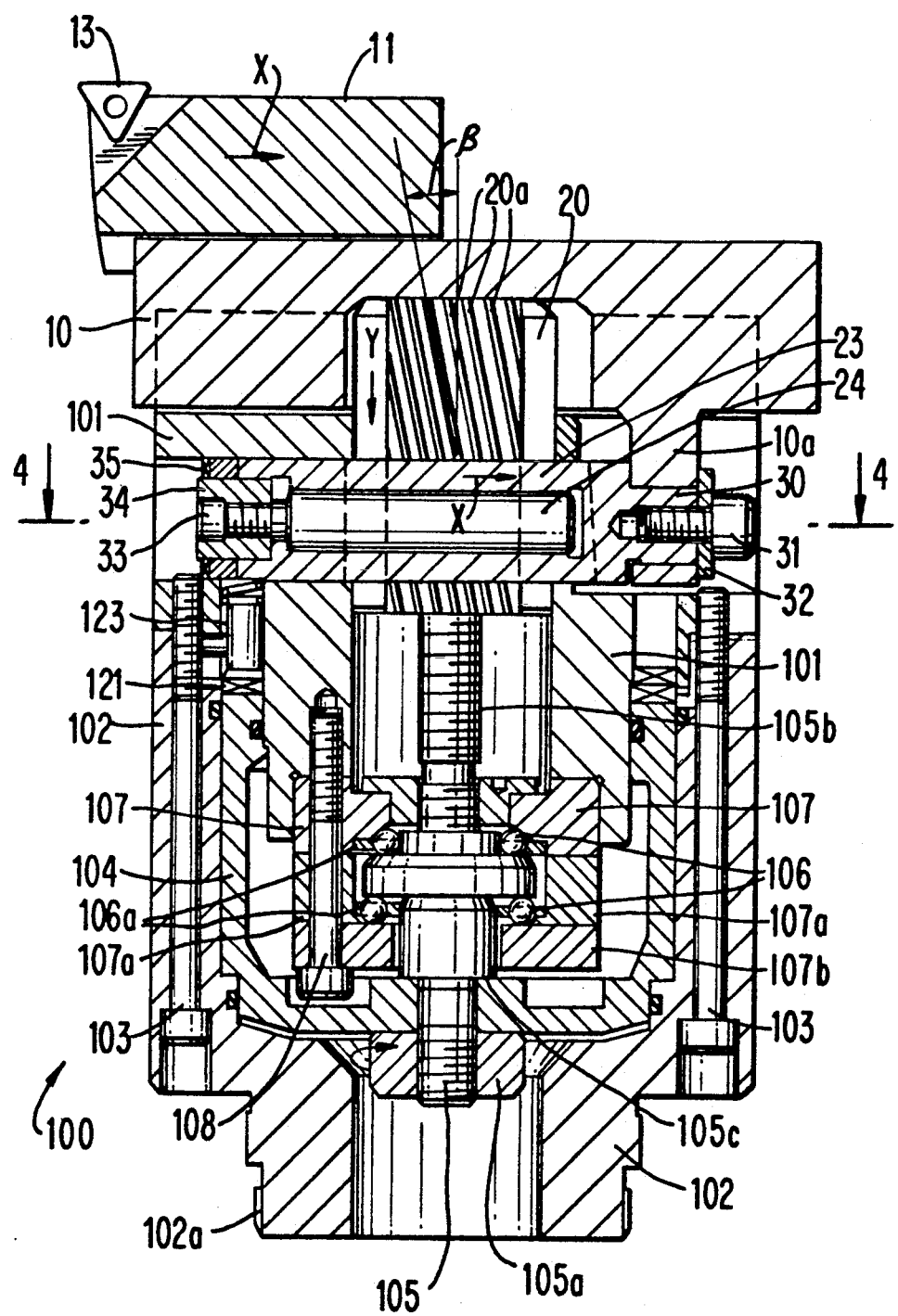
FIG. 3 is a longitudinal section view of the micrometric device in accordance with the present invention taken from line 3—3 of FIG. 2.

FIG. 3 shows a tool in the position of an initial displacement in the inward direction of the longitudinal axis of the micrometric device. The relative displacement of the component parts of the micrometric displacement are represented by X, Y and Z arrows.

Figure 2:
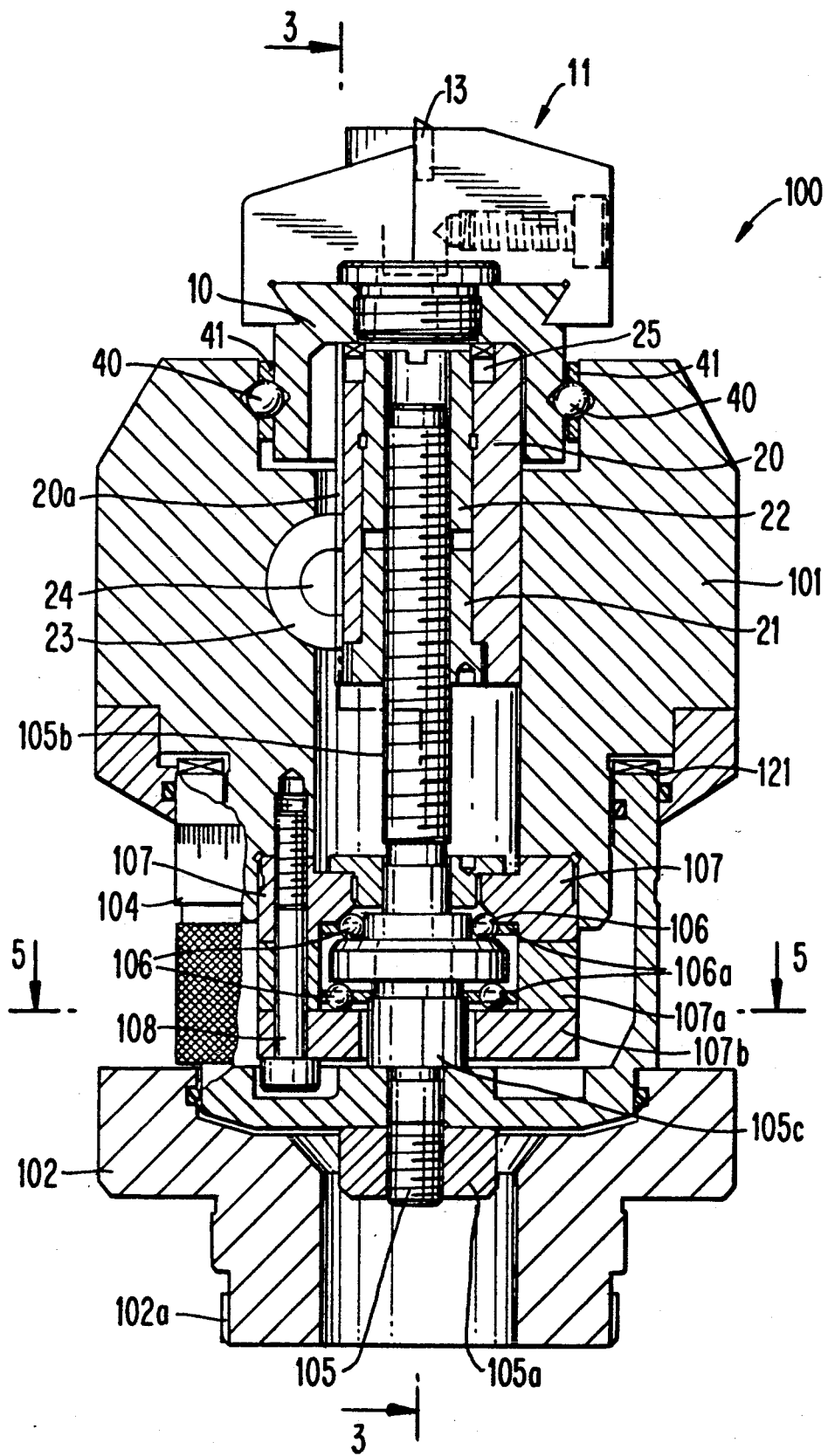
FIG. 2 is a longitudinal section view taken from line 2—2 of FIG. 1 of the micrometric device for finishing high precision bores in accordance with the present invention.
Figure 7:
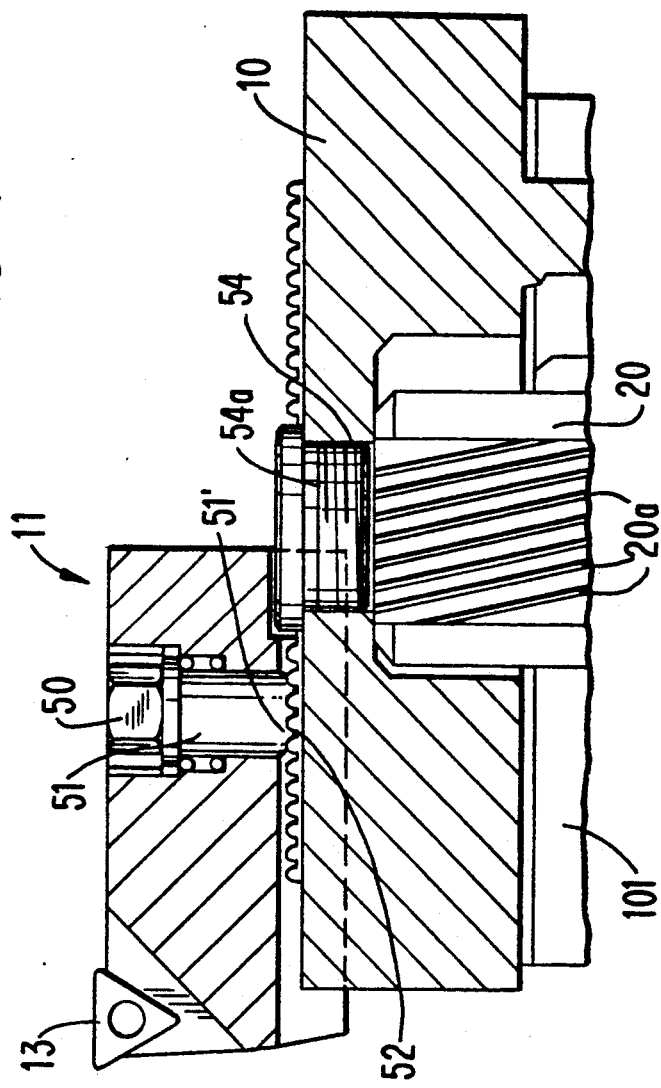
FIG. 7 is a section view of the tool holder used for machining bores larger than the body of the micrometric device in accordance with the present invention.

As shown in FIGS. 2, 7 and 7a, a micrometric device 100 has tool holders, or shanks, 11 and 11a which permit an adjustment in a perpendicular direction to an axis of rotation of the micrometric device 100. This adjustment enables a boring or cutting tool 13 clamped on tool holder 11 or 11a to be maintained on a top portion of a movable crossbeam 10. The boring tool 13 can then be used to bore either large bores, by means of the arrangement of FIG. 7, or bores as small as the smallest diameter of an extension rod 12, by means of the arrangement shown in FIG. 7a. In the embodiment shown in FIG.

7a, the boring tool 13 is arranged on the extension rod 12.

Micrometric device 100, as shown in FIGS. 1, 2 and 3, is internally provided with a mechanism which is different from that provided on the micrometric devices described in the previous patent applications applied for by the same applicant. Thus, the present invention permits a shorter and more compact construction of a micrometric device 100 as a whole, with a reduction in the overhang of the tool 13 and an increase in the rigidity of the tool 13. Thus, the effects of centrifugal force are minimized as much as possible when the micrometric device rotates at high operating speed.

In accordance with the present invention, improved micrometric device 100 is provided with a movement transmission mechanism consisting of a graduated drum 104 coaxially and jointly mounted on a micrometric screw 105. The mounting arrangement of the drum 104 to the screw 105 is achieved such that a rotation of the drum 104 results in a rotation of the micrometric screw 105.

The micrometric screw 105 incorporates a collar and is axially maintained and radially supported in relation to the body of the micrometric device 100 through two series of balls 106 and accompanying spacer rings 106a. The spacer rings 106a, with the series of balls 106 arranged therein, are anchored inside the body of the micrometric device 100 through rings 107,107b. Between rings 107, 107b, an intermediate ring 107a is arranged so that ring 107 is an upper ring arranged above both ring 107b and intermediate ring 107a in the direction of the cutting tool. Upper ring 107 is provided with a chamfer at its internal lower edge such that the chamfer, together with a rest of a right angle formed on an upper portion of the collar of micrometric device 105, provides a radial and axial support for the balls 106 lodged between the chamfer of ring 107 and the right angle rest of the collar. An upper surface of the ring 107b, which is also referred to as a lower ring, provides in connection with a lower face of the collar of the micrometric screw 105, a second axial support for the balls 106 retained between the faces of the lower ring 107b and the collar of the micrometric screw 105. By means of this arrangement, the support system for supporting the micrometric screw 105 in relation to the body of micrometric device 100 is completed.

The support system consisting of balls 106, spacer rings 106a, rings 107, 107a and 107b, is fixed by fastening screws 108 to an upper body 101 which is shaped substantially as a cylindrical hollow body as shown in FIG. 2. The upper body 101 is jointly attached to a complementary lower cylindrical body 102 by additional fastening screws 103 as shown in FIG. 3, so as to form a single assembly coaxially mounted around the micrometric screw 105.

The micrometric device 100 is provided with external threads 102a at a free edge of the lower cylindrical body 102. The micrometric device 100 can be threaded to a machine tool mandrel (not shown) by means of the external threads 102a.

The lower end of the micrometric screw 105 is provided with a nut 105a for holding the graduated drum 104 in proximity to a shoulder 105c of the micrometric screw 105. A thread 105b is provided on an upper extension of the micrometric screw 105 inside the upper cylindrical body 101. Thread 105b coaxially trespasses through, and engages with, a lower bushing 21 and an upper bushing 22. The upper bushing 22 and lower bushing 21 are provided with internal and external threads which trespass coaxially through, and engage with, an indented cylindrical rod 20 slidably lodged in a coaxial hole of the upper cylindrical body 101.

The indented cylindrical rod 20, together with the lower bushing 21 and the upper bushing 22, comprise one single assembly coaxially mounted around the upper portion or extension of the micrometric screw 105. The assembly is arranged inside the interior of the upper cylindrical body 101 as shown in FIG. 2. The constructive arrangement of the indented rod 20 and bushings 21 and 22 enables the bushings to convert the rotating movement of the graduated drum 104 which is transmitted to the micrometric screw 105, into a linear movement of the cylindrical rod 20. The linear movement of the rod 20 displaces a pair of concentric rods 23 and 24 as shown in FIGS. 2 and 3. The rods 23,24 are arranged perpendicular to the geometric axis of the micrometric screw 105. Thus, the above described arrangement comprises the converting means of the micrometric device in accordance with the present invention.

The upper bushing 22 functions to suppress or substantially remove any backlash between the active thread flanks of the micrometric screw 105 and the active thread flanks of the lower bushing 21. The term "active flanks" indicating those flanks of a thread that ar interacting with the flanks of another thread thereby establishing a contact condition without backlash between the flanks that interact between themselves. The backlash suppression function is performed under a controlled manner due to the fact that the upper bushing 22 is provided with an internal thread 22a and an external thread 22b having different pitch between themselves, i.e. the pitch of the external thread 22b of the upper bushing 22 is different than the pitch of the internal thread 22a of the upper bushing 22. The internal thread 22a of the upper bushing engages with the micrometric screw 105 and therefore the pitch of the internal thread 22a is equal to the pitch of the thread of the micrometric screw 105. As a consequence, the relative displacement between the upper bushing 22 and the cylindrical rod 20 is equal to the difference between the pitches of internal thread 22a and external thread 22b of the upper bushing 22.

Figure 2A:
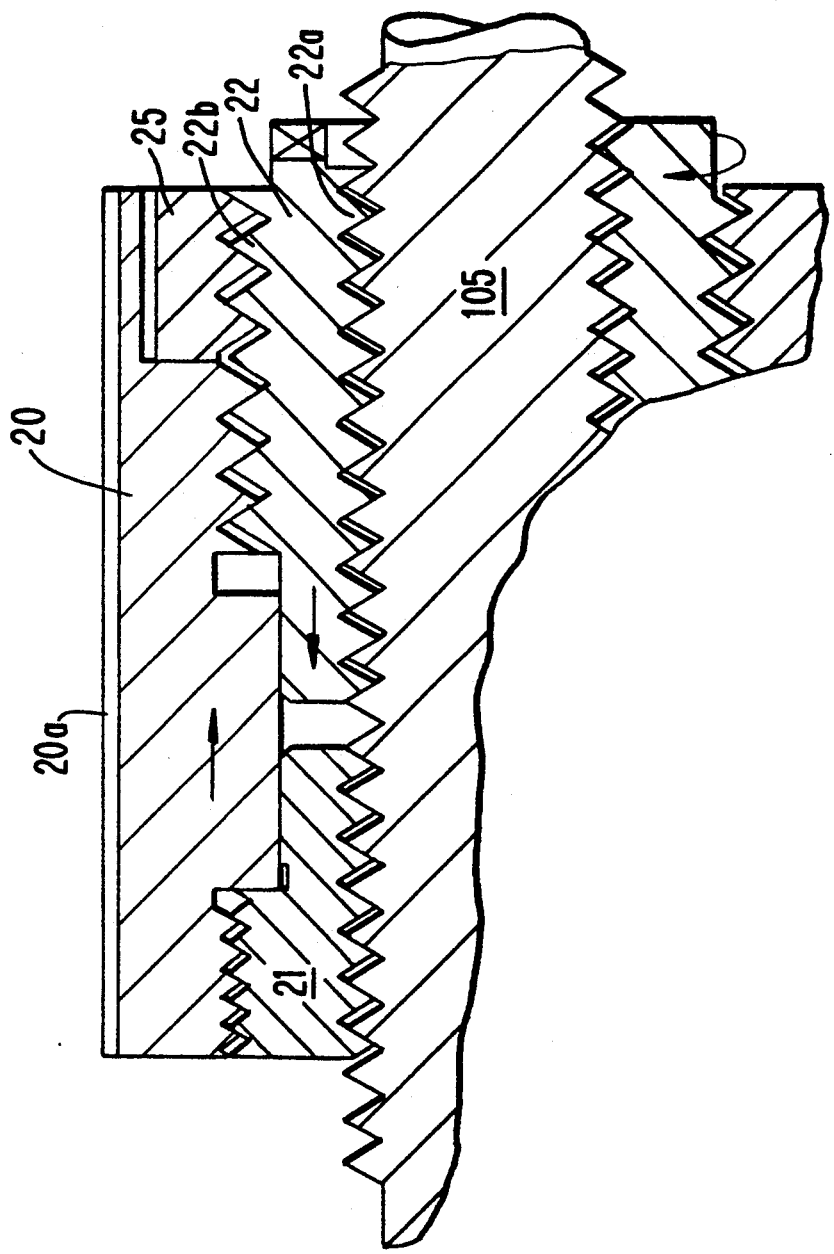
FIG. 2a is an enlarged schematic detail of the micrometric device for finishing high precision bores as shown in FIG. 2, wherein the mechanical elements for converting a rotating movement into a linear movement are illustrated, as well as the backlash suppression system arranged between thread fillets of the micrometric screw and thread fillets of the bushings.

The backlash suppression system also comprises a nut 25 arranged around an upper extreme edge of the upper bushing 22. Nut 25 locks the upper bushing 22 in a set position to maintain a zero or null backlash condition between the active flanks of the thread of the upper bushing 22, the thread of the lower bushing 21 and the thread of the micrometric screw 105 as shown in FIG. 2a.

As shown in FIGS. 2, 2a, 3, 4 and 4a, the cylindrical rod 20 incorporates a plane portion contained on an imaginary, dimensional parallel plane to its geometric axis. The plane portion is provided with rectilinear teeth 20a which are oriented at an angle $\beta$ in relation to the geometric axis of the rod 20. The geometric axis of the rod 20 coincides with the geometric axis of the micrometric screw 105. The rectilinear teeth 20a are formed by converging flanks which mate with teeth 23a and 24a arranged on the plane portion of each one of the concentric rods 23 and 24, respectively. The teeth 23a,24a on rods 23,24 are formed of converging flanks. The plane portion of each concentric rod is contained on the same imaginary plane and arranged parallel to the geometric axis of those rods. The plane portion of each rod 23,24 coincides with the imaginary plane that contains the plane portion of the cylindrical rod 20.

The conversion of a longitudinal displacement of the cylindrical rod 20 into a perpendicular displacement of the concentric rods 23 and 24 is achieved through the slidable coupling of the indented parts, e.g., teeth 20a, 23a, and 24a.

Figure 4:
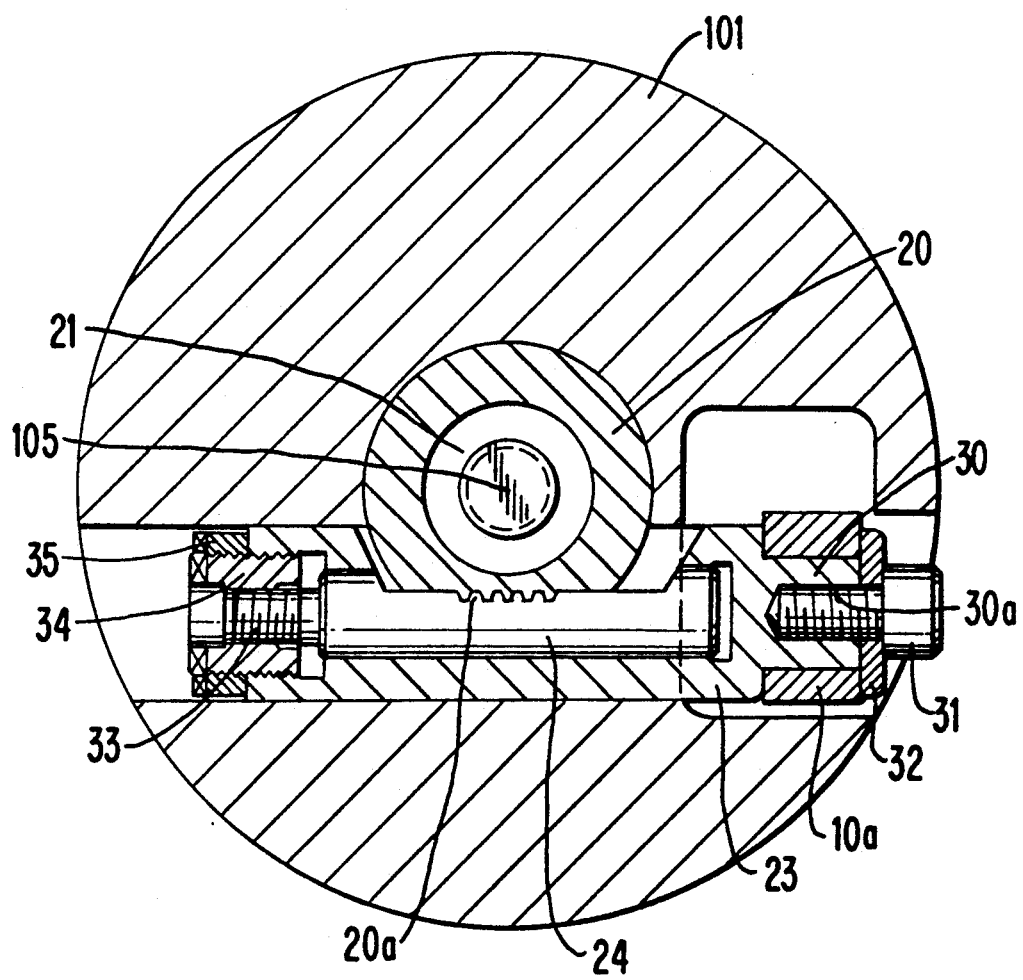
FIG. 4 is a cross section view of the micrometric device taken from line 4—4 of FIG. 3.
Figure 4A:
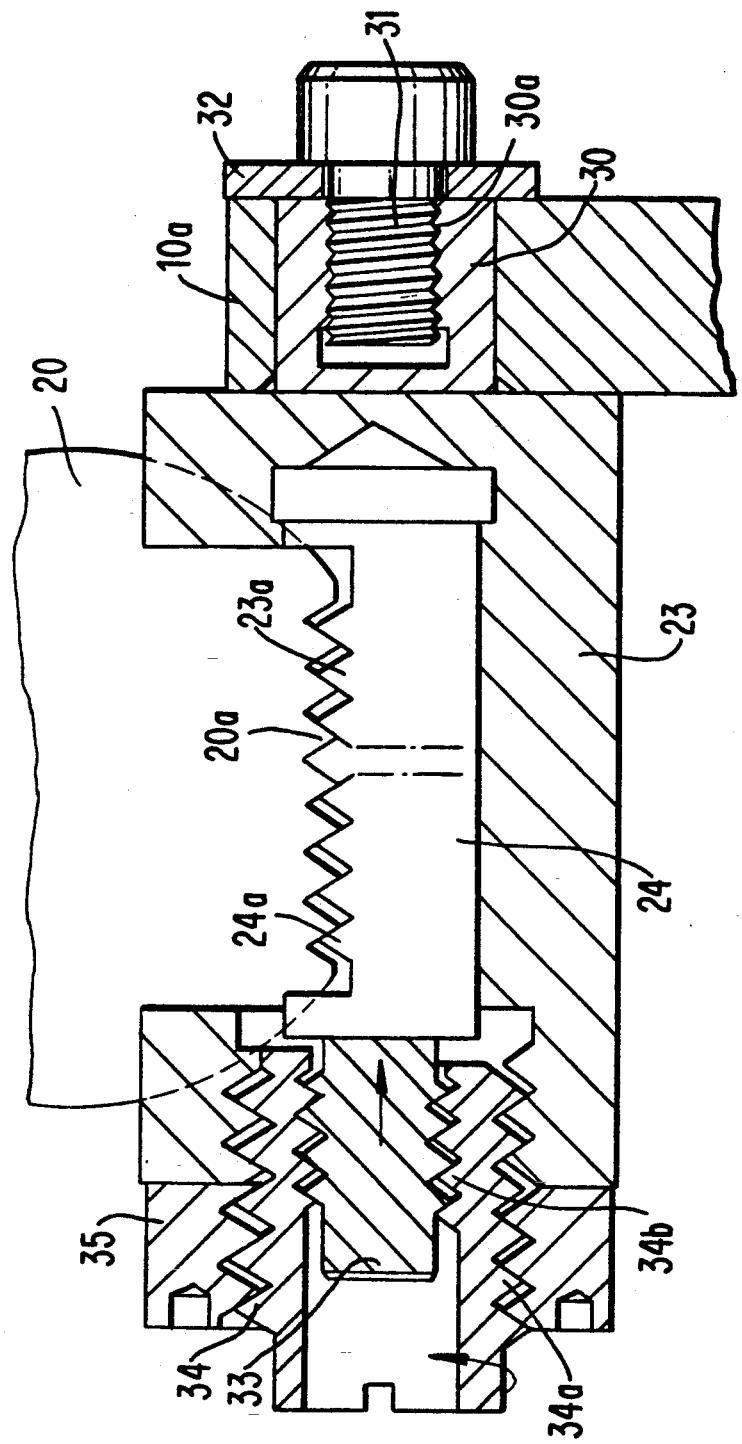
FIG. 4a is an enlarged schematic detail of FIG. 4 showing mechanical elements for converting axial motion into radial or cross motion, as well as illustrating the backlash suppression means between indented elements.

As shown in FIGS. 3, 4 and 4a, rod 24 is arranged in the interior of rod 23. Rod 23 has a terminal 30 arranged at one side. Terminal 30 is provided with a thread 30a which interacts with a screw 31 lodged in the terminal 30. Screw 31 holds an ear, or projection, 10a of the crossbeam 10. Ear 10a is held between a portion of the terminal 30 and a washer 32 by the action of the screw 31.

On the opposite side of the pair of concentric rods 23 and 24, rod 24 has a terminal 33 which is provided with an external thread. A bushing 34 has an internal thread 34b which engages with the threading on terminal 33. Bushing 34 also has an external thread 34a which has a different pitch than the internal thread 34b. In this case, and in a similar manner to the action of the threads of different pitches of the upper bushing 22, the external thread 34a of the bushing 34 has a pitch different from the pitch of its internal thread 34b which is equal to the pitch of the thread of terminal 33. This arrangement has a double purpose, that is, to enable an ultra fine adjustment of a relative displacement to be made between concentric rods 23 and 24, and also to enable the suppression of backlash between teeth 20a of cylindrical rod 20 and teeth 23a and 24a of concentric rods 23 and 24, respectively. This is achieved by guaranteeing a metal to metal contact as described in patent application No. PI 9006125.

The improvements in a micrometric device for finishing high precision bores in accordance with the present invention further comprises a nut 35 arranged on the external thread 34a of bushing 34. Nut 35 functions to maintain substantially constant the pre-established conditions of zero backlash through adjustment of the bushing 34. FIG. 4a shows the locking action of nut 35 actuating simultaneously against bushing 34 and rod 23 to assure the condition of zero backlash between the active flanks of the assembly.

As shown in FIGS. 2 and 3, the movable crossbeam 10 that actuates as a slidable support for tool shanks 11 and 11a moves in a guided path by means of two rows of balls 40 that roll with minimum friction and without play on linear and parallel tracks, or guideways. The guideways are provided in a "V" shape on the walls of a recess existing on the upper portion of upper body 101 and on the sides of the movable crossbeam 10. The recess extends from one side to the other in the upper portion of upper body 101 in a perpendicular direction to the geometric axis of the micrometric screw 100. In this manner, the movable crossbeam 10 is also displaced perpendicular to the geometric axis of the micrometric screw 100. The displacement of the movable crossbeam 10 is achieved in an extremely stable way (without rocking) because the movable crossbeam 10 rests on three points. Two of the points are formed by the balls 40 lodged in the "V" shaped guideways and the third resting point is comprised by the connection of the ear 10a of the movable crossbeam 10 to the terminal 30 of the concentric rod 23.

Figure 6B:
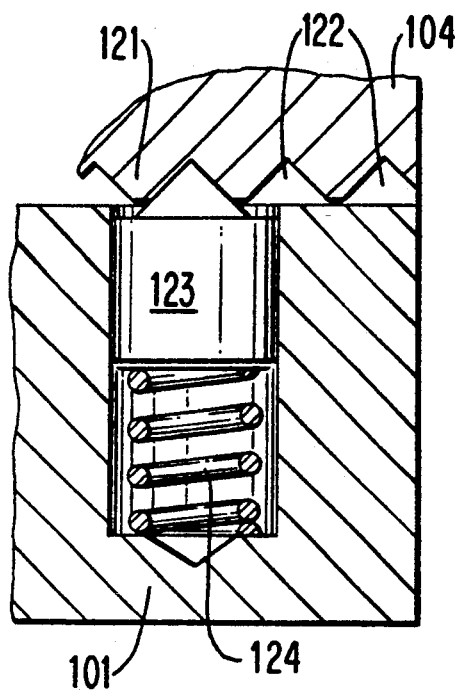
FIGS. 6b and 6c are enlarged and partially cut schematic longitudinal section views of the free end of graduated drum showing two locating pins in a device in accordance with the present invention.
Figure 6C:
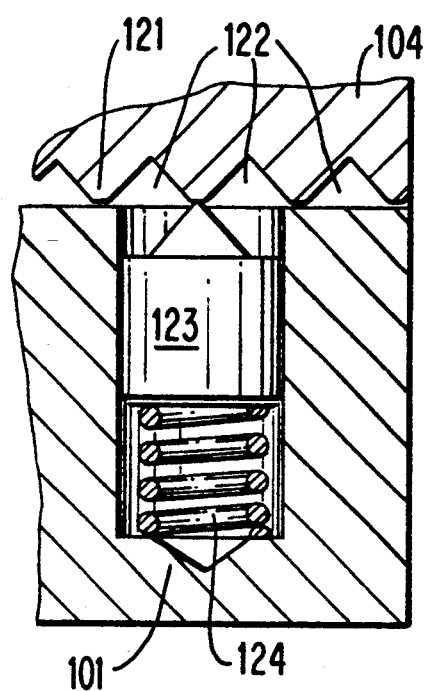
Figure 6A:
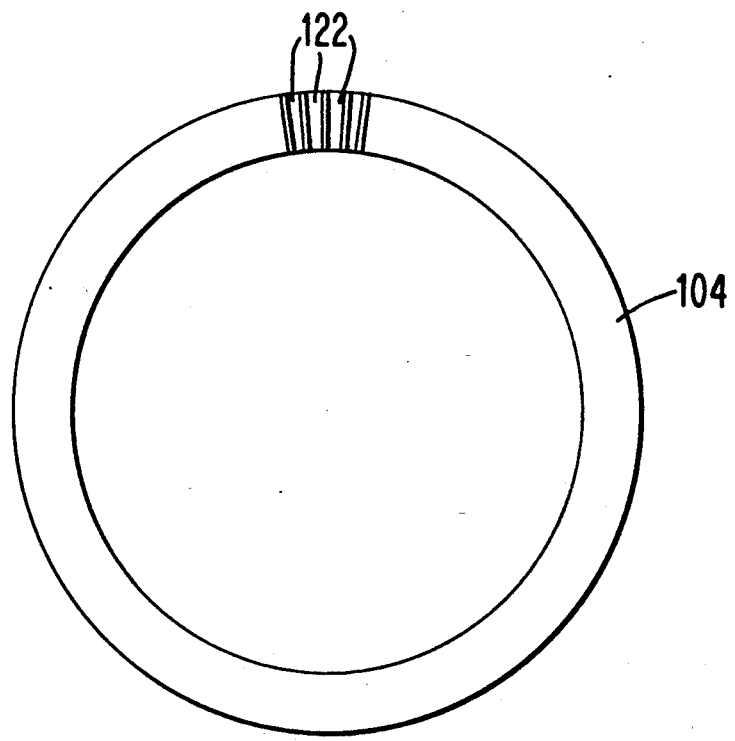
FIG. 6a is a front view of the circular face of the graduated drum showing a plurality of teeth uniformly displayed around the circular face and converging to its center.

As shown in FIGS. 2, 6b and 6c, the free end of the graduated drum 104 is provided with a plurality of teeth 121 and spaces 122 arranged between the teeth 121. At least one pair of locating pins 123 actuate on the teeth 121. A free end of each locating pin 123 is preferably engaged in one space between any two teeth 121 and/or on the crest of any teeth. Thus, if one of the locating pins is engaged in a space between two teeth, the free end of the other locating pin will be resting on crest of another one of the teeth 121. In order to prevent the locating pins 123 from interfering with one another, the locating pin which is resting on the crest of one of the teeth is not one of the two teeth which define the space therebetween in which the other locating pin is positioned.

Referring to FIGS. 2 and 6b and 6c and the description above, the action of springs 124 on the locating pins 123 is directed to establish a condition of resilient pressure in such a way that the locating pins 123 actuate and perform their inherently effective function as locating pins for the graduated drum 104. As such, the locating pins will provide adequate angular positioning for the drum 104 and at the same time prevent an accidental adjustment change of the angular position previously made.

In FIGS. 6b and 6c, a gap is defined between the position of the locating pins 123 and the spaces 122 in such a manner so as to generate a duplicity of stages of radial displacement of the graduated drum 104. Therefore, the second locating pin 123 is positioned at an angular distance of a half pitch larger or smaller than a complete quantity of pitches so that before the first pin 123 reaches a new position after rotation 1/n, the set of spaces 122 is located and actuated by the second pin 123. The fraction 1/n corresponds to one nth, wherein n is the number of spaces and defines the pitch which is equal to the interval between two consecutive spaces.

From the above, the result is obtained that each half pitch is equal to the fraction 2/n, or two nth, which in turn corresponds to one line (or division) of the graduated drum 104.

The number of locating pins in the device of the present invention may be more than two pins 123. In one embodiment, for example, four locating pins 123 may be used wherein two of the locating pins 123 are positioned on the crest of any teeth 121 and between spaces 122 not occupied by the remaining two locating pins.

Figure 5:
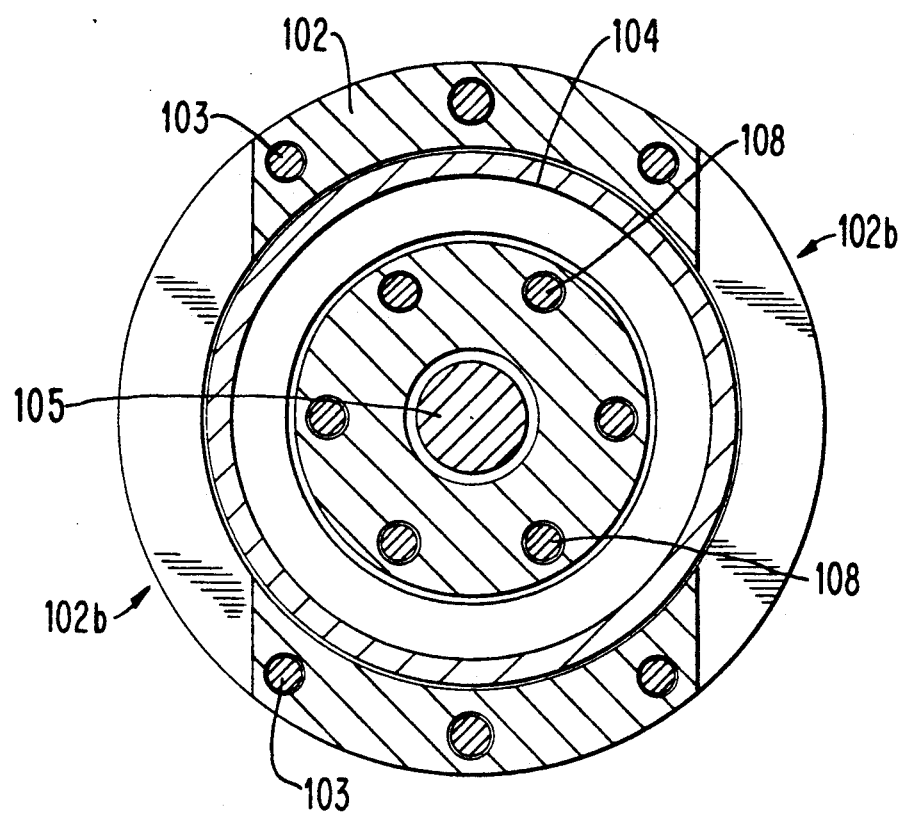
FIG. 5 is a cross section view of the micrometric device taken from line 5—5 of FIG. 2 showing fastening screws and two openings for accessing the graduated drum.

As shown in FIG. 5, manual access to the graduated drum 104 is through lateral openings 102b arranged in the lower body 102 which permits normal rotation of graduated drum 104. The rotation of graduated drum 104 can also be made by several external non-manual actuating means (not shown). In this embodiment, a drum 104 is used which is capable of receiving movements from the external actuating means.

Tool shanks 11 and 11a are held on the crossbeam 10 by juxtaposition of dovetail parts arranged on the upper surface of the crossbeam 10 and on the lower surface of the tool shank 11 and 11a. Preferably, the parts on the crossbeam are of the male variety while the parts on the tool shank are of the female variety corresponding to the male parts to ensure an adequate fit.

FIGS. 1, 7, and 7a show a safety device to prevent the tool shank 11 and 11a from loosening up when subject to a centrifugal force. This is achieved by introducing a threaded stud 50 that presses against a safety pin 51 provided with a toothed terminal 51' which engages on teeth 52 located on the upper surface of the crossbeam 10. The tool shank 11,11a are provided with screws 53 that hold the tool shank 11,11a in a secure position by tightening it against the crossbeam 10 and allow also the pre-positioning of tool shank 11,11a in accordance with the bore diameter to be finished by the micrometric device 100.

The device also comprises a threaded hole 54 which is provided with a threaded plug 54a. The hole 54 provides access to a normal tool in the event an adjustment of the upper bushing 22 is required as the upper bushing 22 suppresses mechanical backlash as described and shown in FIG. 2a.

The examples provided above are not meant to be exclusive. Many other variations of the present invention would be obvious to those skilled in the art, and are contemplated to be within the scope of the appended claims.

I claim:

1. An improved micrometric device for finishing high precision bores, comprising
    a tool holder having a cutting tool arranged thereon,
    a substantially cylindrical body having an interior,
    a movable crossbeam for supporting said tool holder,
    displacement means arranged in the interior of said body for displacing said tool holder, said displacement means including a backlash suppression system,
    a micrometric screw having an axis of rotation and arranged in the interior of said body, said micrometric screw having an upper extension,
    converting means for changing a rotational movement of said micrometric screw into a linear movement of said movable crossbeam, said converting means being connected to said upper extension of said micrometric screw, and
    a graduated drum coaxially mounted and connected to said micrometric screw,
    said cylindrical body comprising an upper cylindrical body and a lower cylindrical body, said upper cylindrical body being mounted on said lower body, said graduated drum being coaxially arranged between said upper cylindrical body and said lower cylindrical body.

2. The device of claim 1, wherein said tool holder is moved on an upper surface of said crossbeam by said displacement means in a direction perpendicular to the rotating axis of said micrometric screw, and said cutting tool is fixed directly on said tool holder or on an extension of said tool holder such that said cutting tool is arranged to bore holes.

3. The device of claim 1, wherein said graduated drum comprises movement transmission means which transmit a rotating movement of said graduated drum to said micrometric screw, and said micrometric screw having radial and axial support means for supporting said micrometric screw in relation to said body, said radial and axial support means comprising two series of balls and spacer rings arranged around each of said balls, and additional rings for anchoring said radial and axial support means in the interior of said body.

4. The device of claim 3, wherein said additional rings comprise an upper ring and a lower ring, said upper ring having a chamfer on an internal lower edge, said chamfer defining a support for said balls in the radial and axial directions, said lower ring defining an axial support for said balls, said device further comprising fastening screws for fastening said radial and axial support means to said upper cylindrical body, and additional fastening screws for fastening said upper cylindrical body to said lower cylindrical body such that a single assembly is coaxially mounted around said micrometric screw.

5. The device of claim 1, wherein said lower cylindrical body has an external thread through which said micrometric device is attached to a machine-tool mandrel.

6. The device of claim 1, further comprising a nut arranged at a lower end of said micrometric screw for holding said graduated drum in proximity to a shoulder of said micrometric screw, said converting means comprising
    a lower bushing and an upper bushing arranged in the interior of said upper cylindrical body and having internal and external threads,
    an upper extension of said micrometric screw being arranged in the interior of said upper cylindrical body and having a thread, said thread of said micrometric screw being arranged coaxial to and engaging with the internal threads of said lower bushing and said upper bushing, and
    a cylindrical indented rod slidably lodged in the interior of said upper cylindrical body, said indented rod having internal threads engaging with the external threads of said lower bushing and said upper bushing, said indented rod, said lower bushing and said upper bushing constituting a single assembly coaxially mounted around said upper extension of said micrometric screw in the interior of said upper cylindrical body,
    a pair of concentric rods arranged in said crossbeam, whereby said lower bushing and said upper bushing convert the rotating movement of said micrometric screw into a linear and perpendicular movement of said pair of concentric rods to move said crossbeam.

7. The device of claim 6, wherein said movable crossbeam is linked to an end of a first rod of said pair of concentric rods through an ear or projection such that said tool holder is displaceable in a radial direction.

8. The device of claim 6, wherein said upper bushing is structured and arranged to suppress backlash in a controlled manner between active flanks of the thread of said micrometric screw and active flanks of the internal thread of said bushing, the internal thread of said upper bushing having a different pitch than the external thread of said upper bushing.

9. The device of claim 8, wherein the relative displacement between said upper bushing and said cylindrical rod equals the difference between the pitches of the internal thread and the external thread of said upper bushing, said upper bushing having a nut arranged around an extreme upper edge, said nut locking said upper bushing and maintaining substantially constant the condition of zero or void backlash between the active flanks of the internal threads of said upper bushing and said lower bushing and the threads of said micrometric screw.

10. The device of claim 6, wherein said indented rod has a planar surface provided with rectilinear teeth, said rectilinear teeth having converging flanks, and each of said pair of concentric rods has a planar surface provided with rectilinear teeth, said rectilinear teeth of said pair of concentric rods having converging flanks and being coupled to said teeth of said indented rod such that said flanks of said pair of concentric rods slide on said flanks of said indented rod, said pair of concentric rods being displaced at a 90° angle in relation to the axis of said micrometric screw, and said teeth of said indented rod being arranged at an angle of inclination in relation to the longitudinal axis of said indented rod such that a longitudinal displacement of said indented rod causes a perpendicular displacement of said pair of concentric rods.

11. The device of claim 10, wherein said planar surface of said indented rod is arranged in an dimensional plane which extends parallel to the geometric axis of said micrometric screw.

12. The device of claim 11, wherein said planar surface of each of said concentric rods is contained in the same dimensional plane, said dimensional plane being defined as the plane parallel to the geometric axes said pair of concentric rods and said micrometric screw.

13. The device of claim 10, wherein a first one of said pair of concentric rods is arranged in the interior of a second one of said pair of concentric rods, said second rod having a terminal portion with an internal thread arranged at a first side, said internal thread of said second rod engaging with a screw, a washer being arranged between said terminal portion and said screw such that an ear or projection of said crossbeam is held between a shoulder of said terminal portion and said washer, said first rod having a terminal portion arranged at a second side opposite said first side, said terminal portion of said first rod having an external thread structured and arranged to engage with an internal thread of an additional bushing, said additional bushing having an external thread of a different pitch than the internal thread of said additional bushing.

14. The device of claim 13, further comprising a nut engaging with the external thread of said additional bushing such that said nut actuates simultaneously on said additional bushing and said second rod to thereby ensure the condition of zero backlash between active flanks in the micrometric device.

15. The device of claim 1, further comprising two rows of balls having respective linear spacers, said two rows of balls rolling in V-shaped linear and parallel tracks arranged on said upper cylindrical body and said crossbeam, said crossbeam being movable in a perpendicular direction to the geometric axis of said micrometric screw and in relation to said upper cylindrical body by means of said two rows of balls.

16. The device of claim 15, wherein each of said two rows of balls is arranged in a dimensional plane that passes through a central portion of said balls, said dimensional plane being perpendicular to the geometric axis of said micrometric screw and parallel to the geometric axis of said pair of concentric rods.

17. The device of claim 15, wherein said crossbeam is supported on said upper cylindrical body at three points, two of said points being formed by said balls lodged in said V-shaped tracks and the a third of said points being formed by an ear of said crossbeam supported at an end of one of said pair of concentric rods.

18. The device of claim 1, further comprising at least one pair of locating pins, said graduated drum having a plurality of teeth and spaces arranged at a free end such that said at least one pair of locating pins actuate on said free end, said locating pins having a free tip which is forced to be either engaged in a space between any two teeth or on a crest of any of said plurality of teeth, said locating pins having corresponding springs that actuate on said locating pins to establish a condition of resilient pressure.

19. The device of claim 18, wherein a gap is defined between the position of said locating pins and respective spaces such that a duplicating number of stages of radial displacement of said graduated drum is generated, a first pin of said at least one pair of locating pins being arranged at an angular distance which is a half pitch larger or smaller than an entire number of pitches so that one of said respective spaces is located and actuated by said first pin of said at least one pair of locating pins before a second pin of said at least one pair of locating pins achieves a new location after 1/n rotations.

20. The device of claim 19, wherein further comprising at least two pairs of locating pins, such that half of the total amount of locating pins is lodged in spaces and the remaining half of the total amount of locating pins is supported on crests of teeth located between consecutive spaces.

21. The device of claim 1, wherein said lower cylindrical body has lateral openings for accessing and rotating said graduated drum.

22. The device of claim 1, wherein said graduated drum is structured and arranged for receiving movement from non-manual external actuating means, said graduated drum being rotated by said external actuating means.

23. The device of claim 1, wherein said tool holder is clamped on said crossbeam by aligning male portions arranged on an upper surface of said crossbeam with corresponding female portions arranged on a lower portion of said tool holder, said micrometric device further comprising safety means to protect said tool holder from loosening when subjected to centrifugal forces, said safety means comprising a safety pin and a threaded stud which presses said safety pin, said safety pin having an indented end engaging with teeth arranged on the upper surface of said crossbeam, said safety means further comprising screws structured and arranged for tightening said tool holder against said crossbeam and for pre-positioning said tool holder to a desired bore diameter of bores to be finished by said micrometric device 24. The device of claim 23, wherein said crossbeam has a hole arranged therein and a plug for closing said hole, said hole permitting access of a manual tool for adjusting an upper bushing of said backlash suppression system.

* * * * *